United States Patent
Prather

(10) Patent No.: US 6,866,289 B2
(45) Date of Patent: Mar. 15, 2005

(54) MULTI-LEVEL PERSONAL HAND CART

(75) Inventor: James G. Prather, Yorba Linda, CA (US)

(73) Assignee: Wynd Wurx, LLC, Yorba Linda, CA (US)

(*) Notice: Subject to any disclaimer, the term of this patent is extended or adjusted under 35 U.S.C. 154(b) by 0 days.

(21) Appl. No.: 10/055,816

(22) Filed: Jan. 22, 2002

(65) Prior Publication Data

US 2002/0171214 A1 Nov. 21, 2002

Related U.S. Application Data

(60) Provisional application No. 60/263,299, filed on Jan. 22, 2001.

(51) Int. Cl.$^7$ ................................................. B62B 3/02
(52) U.S. Cl. ................. 280/651; 280/47.19; 280/47.35; 280/33.996; 280/33.998
(58) Field of Search .................. 280/33.991, 33.994, 280/33.995, 33.996, 33.997, 33.998, 39, 639, 651, 652, 654, 47.18, 47.19, 47.26, 47.35, 79.3

(56) References Cited

U.S. PATENT DOCUMENTS

| | | | | |
|---|---|---|---|---|
| 2,901,262 A | * | 8/1959 | Berlin | 280/641 |
| 2,967,060 A | * | 1/1961 | Berlin | 280/652 |
| 3,052,484 A | * | 9/1962 | Huffman et al. | 280/654 |
| 3,074,734 A | * | 1/1963 | Munson et al. | 280/641 |
| 3,162,462 A | * | 12/1964 | Elders | 280/47.35 |
| 3,191,956 A | * | 6/1965 | Rizzuto | 280/641 |
| 3,207,526 A | * | 9/1965 | Broderick | 280/652 |
| 3,236,536 A | * | 2/1966 | Shore | 280/652 |
| 3,272,528 A | * | 9/1966 | Young et al. | 280/33.996 |
| 3,310,317 A | * | 3/1967 | Luff | 280/652 |
| 3,388,920 A | * | 6/1968 | Hill, Sr. et al. | 280/641 |
| 3,514,123 A | * | 5/1970 | Injeski | 280/652 |
| 3,717,225 A | | 2/1973 | Rashbaum et al. | |
| 3,774,929 A | * | 11/1973 | Stanley | 280/641 |
| 4,047,724 A | | 9/1977 | Shaffer | |
| 4,185,848 A | | 1/1980 | Holtz | |
| 4,339,141 A | | 7/1982 | Thiboutot | |
| 4,765,646 A | * | 8/1988 | Cheng | 280/651 |
| 5,090,724 A | * | 2/1992 | Fiore | 280/643 |
| 5,294,158 A | * | 3/1994 | Cheng | 280/641 |
| 5,315,290 A | | 5/1994 | Moreno et al. | |
| 5,865,449 A | * | 2/1999 | Castaneda | 280/33.996 |
| D407,882 S | | 4/1999 | Duchene | |
| 5,901,482 A | * | 5/1999 | Sawyer et al. | 40/308 |
| 6,037,869 A | | 3/2000 | Lace | |
| 6,054,923 A | | 4/2000 | Prather et al. | |
| 6,125,972 A | | 10/2000 | French et al. | |
| 6,126,181 A | | 10/2000 | Ondrasik | |
| 6,127,927 A | | 10/2000 | Durban et al. | |
| 6,271,755 B1 | | 8/2001 | Prather et al. | |

* cited by examiner

Primary Examiner—Christopher P. Ellis
Assistant Examiner—Jeff Restifo
(74) Attorney, Agent, or Firm—Terrell P. Lewis

(57) ABSTRACT

A multi-level personal utility cart includes a handle having an upper portion, opposing side portions and a lower portion, a first basket assembly including panels at the front, sides, and bottom thereof, the first basket assembly being supported by the handle, a second basket assembly including panels at the front, sides, and bottom thereof, the second basket assembly being supported by the handle, the first basket assembly being positioned atop the second basket assembly, and the first and second basket assemblies being pivotally supported to the handle, so that the first and second basket assemblies are collapsible into a compact and substantially planar structure.

16 Claims, 5 Drawing Sheets

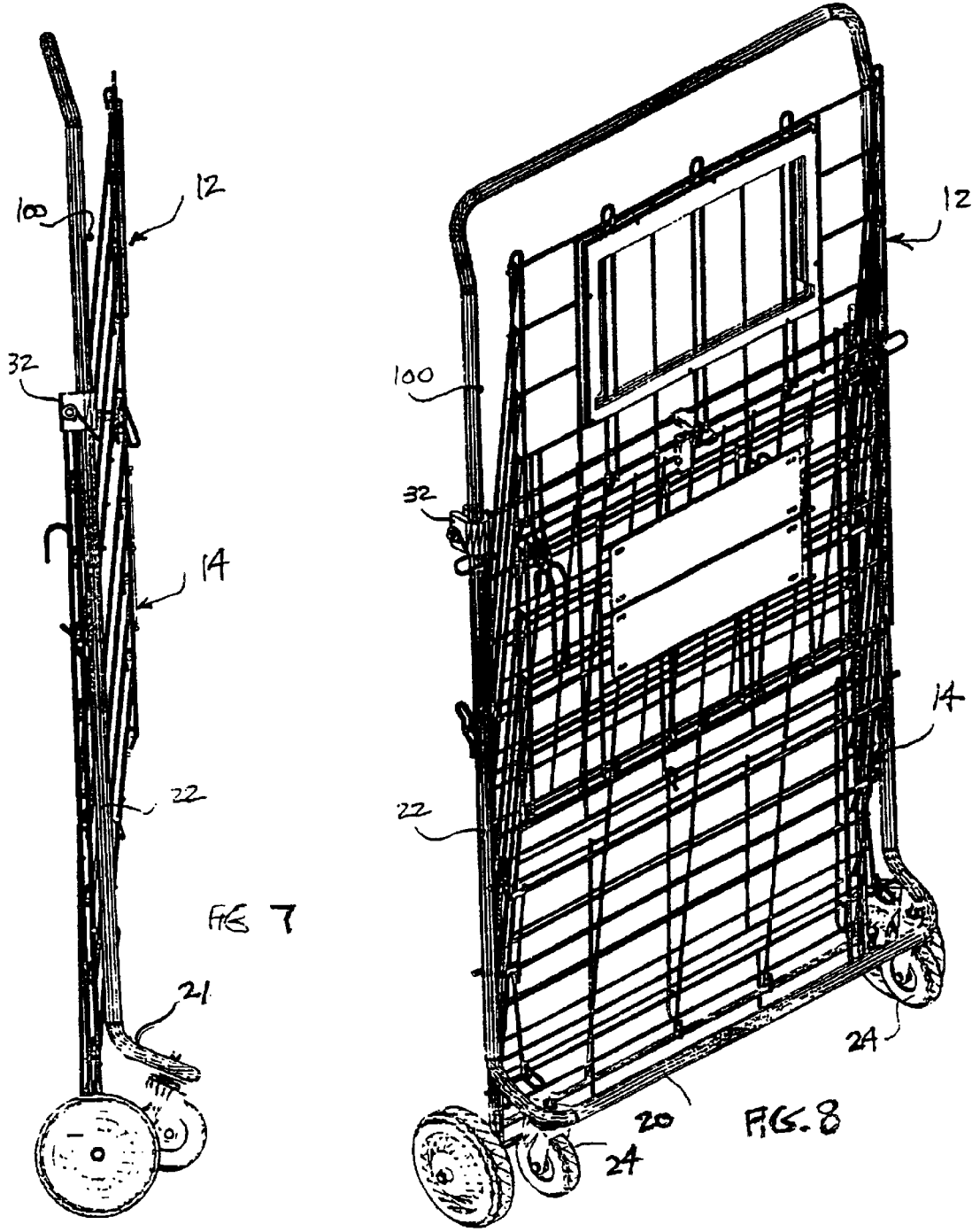

MULTI-LEVEL PERSONAL HAND CART

This application claims priority from, and also incorporates by reference, the entire disclosure of, Provisional Patent Application Ser. No. 60/263,299 filed Jan. 22, 2001, and entitled MULTI-LEVEL PERSONAL HANDCART.

BACKGROUND OF THE INVENTION

1. Field of the Invention

The present invention relates to hand or utility carts used by persons for transporting goods or personal belongings, and more particularly to collapsible hand or utility carts having multiple levels of containment for holding such goods or belongings.

2. Description of the Related Art

It is well known that shopping carts, of the kind typically found in supermarkets, department stores or other such stores where consumers select goods from in-store shelving and displays, have been used as vehicles for transporting merchandise purchased at those markets to and from the purchaser's automobiles. It is also well-known that many purchasers, especially those persons who do not have automobiles or who reside in low-income areas, are prone to using the shopping carts for transporting their purchased goods to their residences or at the very least to their neighborhoods where they are able to unload their purchases and keep the carts in the ready for the next time it is necessary to return to those markets.

However, the removal of shopping carts from market premises by patrons or shoppers is a situation that has not been met with great favor, both in the industry and in the community, and a multitude of solutions for preventing the removal of such carts from the market premises have been devised. Among those currently most favored by the industry are electronically triggered devices which cause the wheels of the cart to lock up when the cart is pushed or otherwise moved past a pre-installed boundary, which typically takes the form of a buried electronically triggering cable disposed about the perimeter of the market's parking lot or premises.

Examples of such systems are embodied in U.S. Pat. Nos. 6,054,923 and 6,271,755 issued to Prather et al. Those patents disclose a shopping cart system that incorporates a disabling mechanism that renders the cart's swivel wheels inoperative upon actuation of a disabling signal from the cable. The '755 patent further teaches a shopping cart disabling system which, when triggered, makes available only a pair of wheels that enables movement of the cart, but only in a circular direction. The object of that invention is to make it impossible for a person to remove the cart from the store's premises by rolling it away.

Other theft thwarting systems have been developed and are well known, as that taught by U.S. Pat. No. 3,717,225 to Rashbaum, which discloses a piston rod and wheel lock device that includes a frame mounted actuator that locks one of the wheels of the cart upon actuation via a disabling signal, and various electronically actuated wheel locking devices, as exemplified in U.S. Pat. No. 5,315,290 to Moreno, U.S. Pat. No. 6,127,927 to Durban et al., U.S. Pat. No. 6,037,869 to Lace, and U.S. Pat. No. 6,125,972 to French et al.

In furtherance of one of the objectives of this invention to prevent shopping cart removal from a market's premises, the present invention offers shoppers a shopper-propelled mobile device for transporting purchased goods from the market to their homes. Concurrent with this aim, the invention embraces a scheme that rewards shoppers for using the mobile device of the invention for transporting purchased goods home instead of removing the market's shopping carts from the market's premises for that purpose.

Personal carts for transporting groceries or other personal items have been in use for some time. Typically, such personal carts have a single basket or container supported on or atop a wheeled base, and may additionally be able to be collapsed or otherwise folded to reduce the volume for storage when not in use.

Personal carts have also been developed which can be collapsed or folded so as to be easily storable. Examples of such carts are shown in U.S. Pat. No. 4,339,141 to Thiboutot and U.S. Pat. No. 4,185,848 to Holtz.

And in an effort to enable a shopper to transport increased amounts of goods from the store to the shoppers home or other destination, shopping carts with more than a single basket or container have been developed. For example, U.S. Pat. No. 6,126,181 to Ondrasik shows a conventional shopping cart frame on which are mounted stepped, offset, baskets, U.S. Pat. No. 4,047,724 to Shaffer shows a collapsible utility cart having a plurality of detachable baskets and stair-climbing capabilities, and U.S. Pat. No. D407,882 to Duchene teaches a shopping cart having a frame that is designed for supporting two removable baskets, one atop the other.

The foregoing carts are intended for use in the market and about the market premises. No personal carts are known which are designed for use by the shopper outside of the market premises, and which are also collapsible for storage and have multiple baskets for transporting purchased goods from the market to the purchaser's home.

The preceding examples of carts and personal carts also have limitations as far as their carrying capabilities for purchased goods, and it is clear that there is a need for a personal cart that has significantly greater storage capacity, as for example one which has more than one storage compartment, where the contents of each storage compartment are each uniquely accessible and which will enable shoppers who have purchased their goods to transport their goods from the market to their home in a single trip without the use of motor vehicles. Such a cart must also be collapsible so that storage of the collapsed cart is facilitated as well. The present invention provides a solution to such a need for the shopper as well as the market.

There is also a need for such a cart to be sufficiently inexpensive to the shopper so that the shopper will be induced to acquire the cart in advance of shopping at the market. The present invention contemplates a plan or method for providing carts to the shoppers that benefits not only the shoppers, but the markets and vendors of the markets as well. This method contemplates the sale of the carts to the shoppers with subsequent rebates or discounts running to the shoppers for products or services offered by vendors of the markets as rewards to the shoppers for having purchased the carts.

In one aspect of the invention, there is provided a multi-level personal utility cart including a frame with a handle having a rearwardly positioned upper portion, side portions, and a forwardly extending lower portion, a first basket assembly pivotably supported to the frame, a second basket assembly disposed atop the first basket assembly and pivotably supported to the frame, where the first and second basket assemblies are simultaneously pivotable on the frame toward the handle upper portion so that the first and second basket assemblies can be collapsed against a portion of the frame into a compact and substantially planar structure.

In another aspect of the invention, a hand-propelled or pushed personal shopping cart is provided which includes multiple levels of storage within corresponding multiple, yet separate, storage chambers, with independent access to each chamber.

In another aspect of the invention, a personal shopping cart is provided which is collapsible, inexpensive to manufacture, and inexpensive to own as well.

In yet another aspect of the invention, the shopping cart is easily storable in its collapsed condition.

In still another aspect of the invention, the shopping cart will enable shoppers to own and possess a very affordable personal shopping cart with which they can take to their local shopping market, and into which they can load their purchased goods for subsequent check-out and then transport to their respective residences.

In still another aspect of the invention, a method for deterring theft of "conventional" shopping carts is provided in which shoppers are encouraged to use the "non-conventional" carts of the invention which are sold to the shoppers by markets, and discounts or rebates are made available to the shoppers by vendors who advertise and promote their goods and/or services available at the shopping markets.

Various objects, advantages and features of the invention will become more apparent, as will equivalent structures which are intended to be covered herein, with the teaching of the principles of the invention in connection with the disclosure of the preferred embodiments thereof in the specification, claims and drawings in which:

BRIEF DESCRIPTION OF THE DRAWINGS

FIG. 7 is a side view of the personal shopping cart of the invention in a fully collapsed state; and FIG. 8 is a perspective view of the cart of the invention in a fully collapsed state.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a personal hand cart having multiple levels of storage compartments, while also being collapsible for storage.

Figure 1:
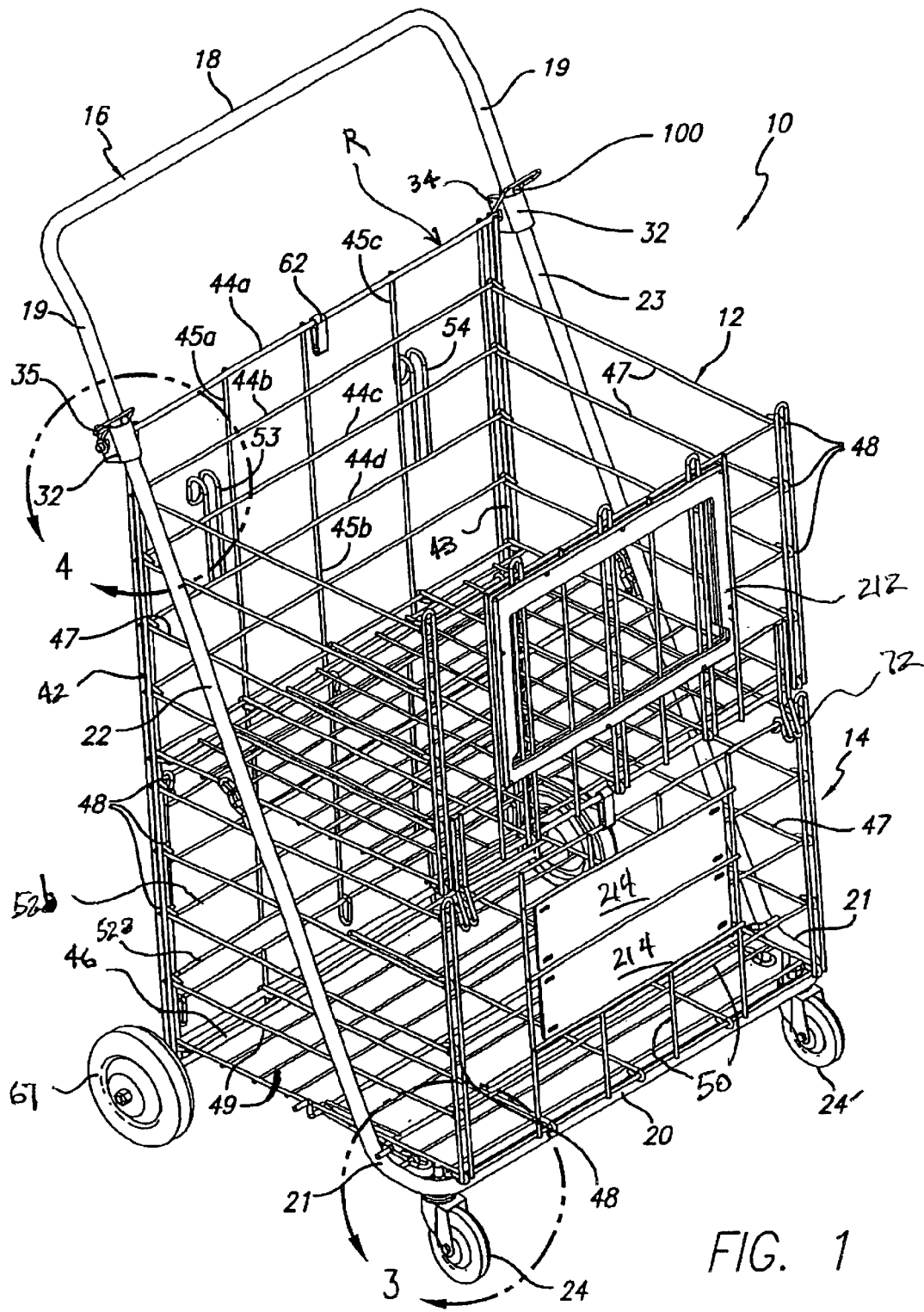
FIG. 1 is a front perspective view of the personal shopping cart of the present invention.
Figure 6:
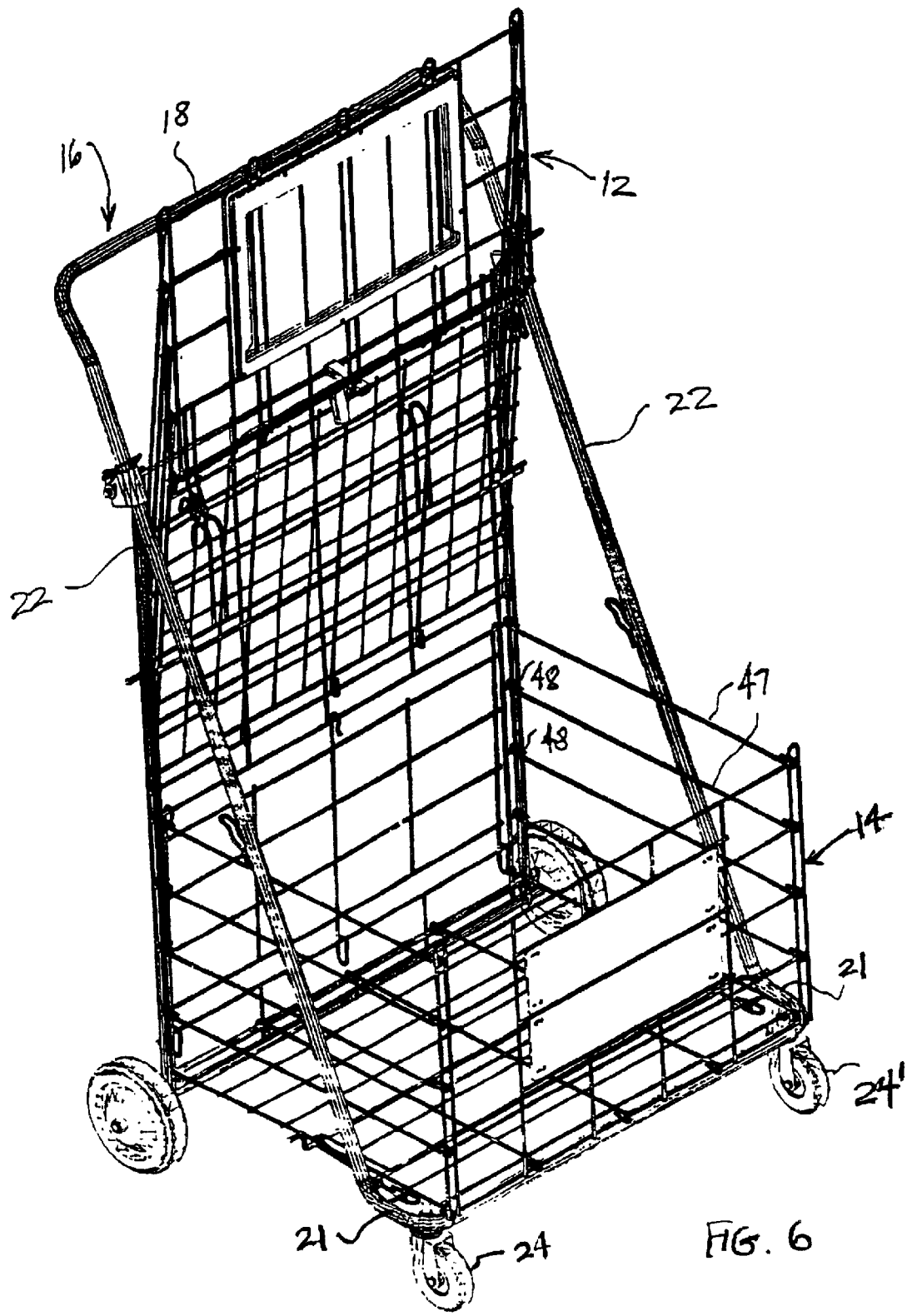
FIG. 6 shows a front perspective view of the personal shopping cart of the invention, where the cart is in a partially collapsed state.

Referring now to the drawings, and specifically first to FIG. 1, the personal cart 10 of the present invention, shown in a functional opened position, is seen to include an upper container or basket assembly 12 and a lower container or basket assembly 14. The upper basket assembly 12 is disposed atop the lower basket assembly 14, and the basket assemblies are capable of being pivoted into a partially functional position (as shown in FIG. 6) or a fully non-functional position (as shown in FIGS. 7 and 8).

Figure 3:
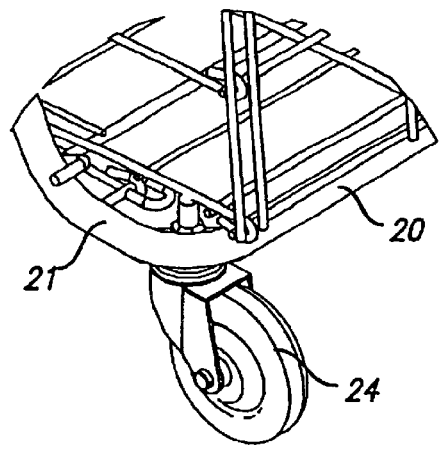
FIG. 3 is a enlarged view of the section marked "3" in FIG. 1 showing the mounting of a caster to the personal shopping cart of the invention.

A handle 16 includes an upper handle portion 18, a lower handle portion 20, and side portions 22, 23 extending between and interconnecting the upper and lower handle portions. Preferably, the side portions 22, 23 are disposed on the exterior of the upper basket assembly 12 and the lower basket assembly 14. Preferably, the upper handle portion 18 and the lower handle portion 20 are both U-shaped, with the upper handle portion 18 being located atop and rearwardly of the cart, and the lower handle portion 20 being located at the lower region of the front of the cart. The U-shaped upper handle portion includes arms 19 which extend from the bight of the upper handle portion downwardly and forwardly to interconnect with the upper portions of the side portions 22, 23. The U-shaped lower handle portion 20 includes arms 21 that extend rearwardly and preferably horizontally from the bight of the lower handle portion 20 outside of the lower basket assembly 14 to interconnect with the lower portions of the respective side portions 22, 23 at the forward region of the cart. Casters 24, 24' are supported at the underside of the lower handle portion 20 at and below the intersection of the forwardmost portion of each of the arms 21 of the lower handle portion and the lateral extremities of the bight portion of the lower handle portion. The casters may be mounted directly to the lower handle portion as shown in FIG. 3, or they may be mounted to reinforcement plates (not shown) fixedly secured to the underside of the lower handle portion. Further, the casters on the front of the cart are preferably swivel casters (as shown in FIGS. 1 and 3) or they may be fixed, non-swiveling, casters.

Figure 4:
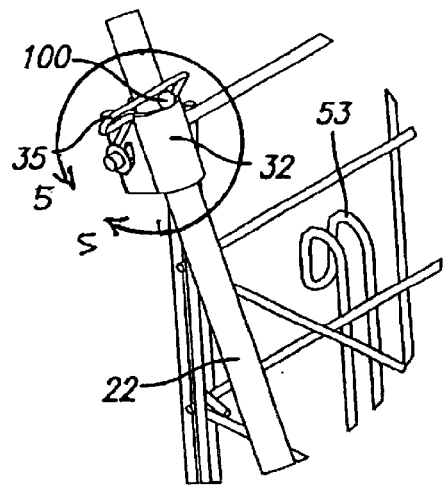
FIG. 4 is an enlarged view of the section marked "4" in FIG. 1 showing the handle and slide elements of the personal shopping cart of the invention.
Figure 5:
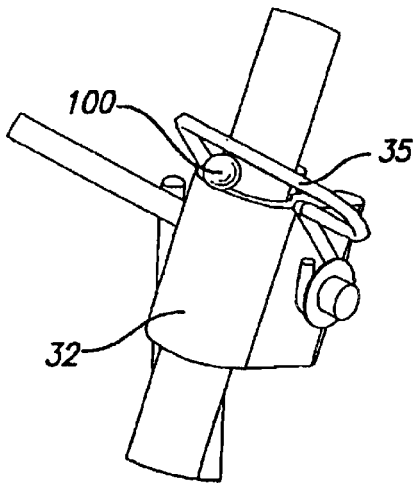
FIG. 5 is an enlarged view of the section marked "5" in FIG. 4 showing details of a slide element and handle of the personal shopping cart of the present invention.

Referring now to FIGS. 1, 4 and 5, a slide element 32 is carried by the upper portion of each of the side portions 22, 23 of the handle assembly. Each respective slide element 32 is positioned at the location of the merger of the upper handle portion arms 19, 19 and the side portions 22, 23. Each of the slide elements 32 comprise a U-shaped member having opposing arms 34, 35 which are secured together at the rear of the side portions 22, 23. The interior of each of the slide elements 32 is configured as a cylindrical channel that closely fits about the circumference of the handle side portion where the slide element is mounted. As a result of this construction, each of the slide elements can ride down and up along the handle side portion on which it is carried whenever the cart is opened or closed, respectively.

In FIGS. 4 and 5, the protruberance or button 100 is seen to be located at the uppermost portion of each of the side members of the handle assembly against which the slide elements 32 will abut when they slide upwardly along the handle side portions 22, 23 upon opening of the cart. A lock 35 carried by each of the slide elements 32 can be snapped over the button 100 to secure each slide member in the position shown in FIG. 1, wherein the cart is held in an opened, functional, position. Each lock 35 (each being carried by one of the slide elements 32) is attached to a respective slide element 32, and may comprise a loop of wire or a hook pivoted to the slide member 32 for motion about a substantially horizontal axis. The lock 35 is used to secure the slide element 32 to which it is attached at a fixed location on the side members 22, 23 by pivoting the lock 35 about the horizontal axis up over the button 100 located on the respective side member. In this manner, the lock 35 keeps the slide element 32 from moving relative to the side member on which it is supported when the cart has been opened, thereby locking the cart in a fully opened position and preventing accidental closure of the cart when the cart contains goods.

Figure 2:
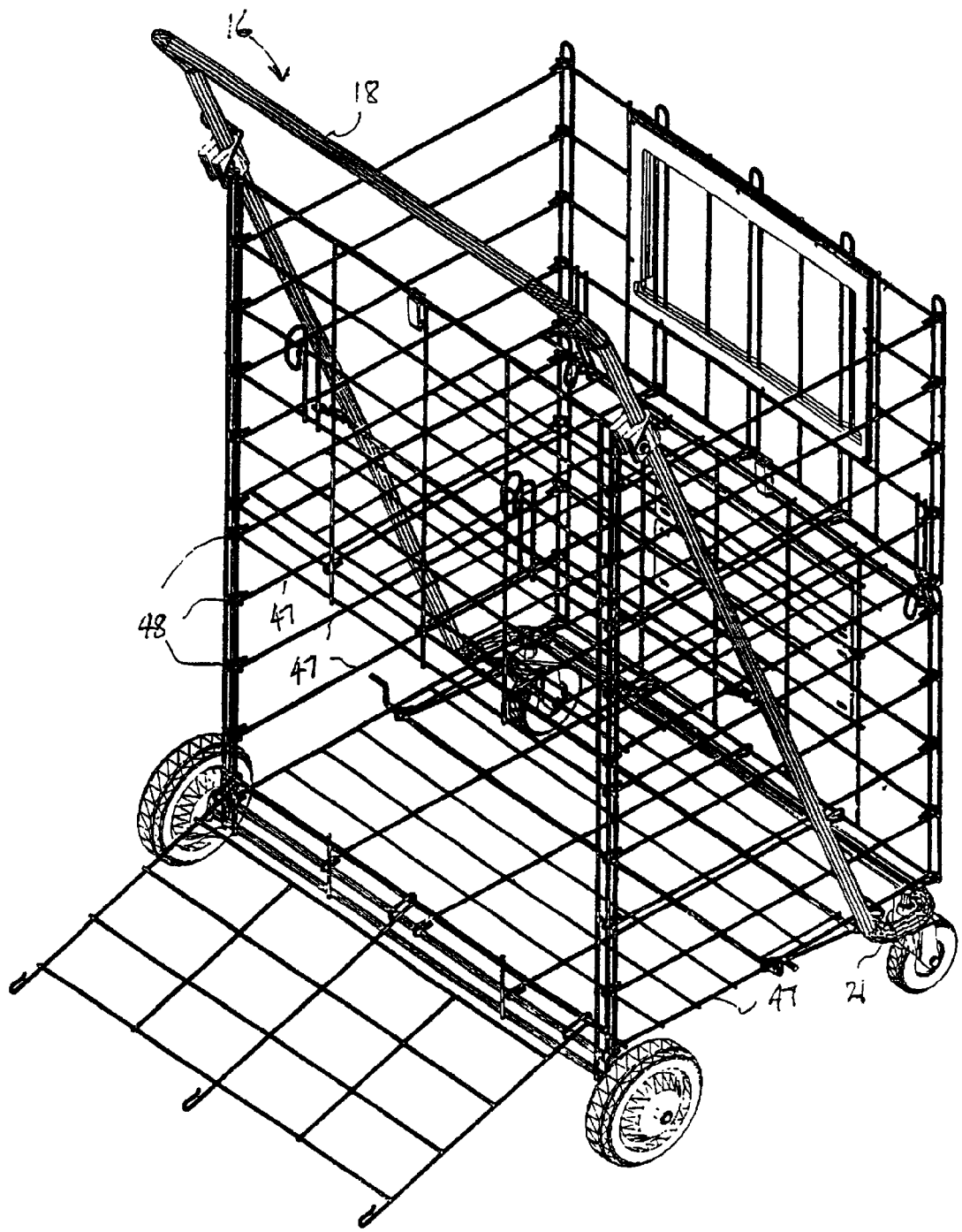
FIG. 2 is a rear perspective view of the personal shopping cart of the present invention.

As seen in FIGS. 1 and 2, an elongated slender member 44a spans the distance between, and is supported by, the two slide members 32. A pair of spaced apart, parallel, substantially vertical support members 42, 43 extend downwardly from the elongated member 44a adjacent to the slide elements 32. Each support member is associated with a respective one of the slide elements 32. The length of the support members 42, 43 is preferably chosen to be greater than the combined height of the upper and lower basket assemblies 12, 14. A plurality of other horizontal support elements 44b, 44c, . . . extend parallel to one another and between the support members 42, 43 at vertically spaced locations downwardly to just below the rearwardly extending horizontal arms 21, 21 of the lower handle member 20. Similarly, several vertically disposed, spaced apart, and parallel slender elements 45a, 45b, 45c are provided for supporting engagement with the horizontal support elements 44a, 44b, . . . . The horizontal support elements 44a, 44b, . . . form, along with the support members 42, 43, a grillwork or latticework panel, which functions as the rear panel R, for the upper and lower basket assemblies 12, 14 An axle member 46 is supported by the lowermost portion of the vertical support elements 42, 43, located preferably below the plane of the floor panel of the lower basket assembly 14. The axle member 46 extends laterally between the support members 42, 43 and carries casters 67 on end portions of the axle member 46.

Each of the upper and lower basket assemblies comprise front, side, and bottom panels. Preferably, each of the front and bottom panels comprise a grillwork or latticework of slender elongated elements 49, 50 (such as wires as shown in the Figures, or thin rods; however, the present invention also contemplates forming the panels from solid sheets of material with wires or pin-like projections extending from the front and rear of the side panels so as to form a structure similar to the side panels shown in the Figures of the drawings). The slender elements 47 of the side panels of the basket assemblies extend from front to rear, and are attached to the front and rear panels of the upper and lower basket assemblies of the cart. When either the top or bottom basket assembly is in an erected state (as shown in FIG. 1), the slender elements 47 are parallel to one another and arranged substantially horizontally. The ends of each slender element 47 in each of the side panels of the upper and lower baskets are formed into loop 48 (as are the front and rear end of each element 49 of the upper and lower basket assembly floor panels) which, at the rear end thereof, is hooked about and pivotable on a horizontal element extending laterally between the support elements 42, 43, and at the forward end thereof is hooked about and pivotable on a horizontal elements 52a, 52b, . . . extending laterally between the support elements 42, 43. The pivoting connections function in such a manner that, after the cart has been opened as shown in FIG. 1, the basket assemblies are permitted to pivot upwardly and rearwardly about the horizontal elements 44a, 44b, 44c . . . and thereby effect collapse of the basket assemblies, either the upper basket assembly alone to achieve a partially collapsed state (as shown in FIG. 6), or the two basket assemblies together to achieve a fully collapsed state (as shown in FIGS. 7 and 8). Each of the upper and lower basket assemblies are independently able to be pivoted upwardly and rearwardly to effect collapse of the two basket assemblies, but the lower basket assembly cannot be collapsed separately from, or before collapse of, the upper basket assembly. The upper and lower basket assemblies can be simultaneously pivoted into a collapsed state (as shown in FIGS. 7 and 8) so as to effect collapse of the entire personal cart for purposes of storage of the cart.

The rear panel R of the cart assumes a substantially vertical orientation when the cart has been fully opened and is seated on the ground on its four casters. The rear panel includes a pair of spaced apart hook elements 53, 54 located on the upper panel portion U to permit suspension of the cart, when completely collapsed, from a structural support (not shown), such as the upper front rail of a conventional shopping cart, a horizontally extending suspension member, suspension elements secured to a wall, etc.

Indicia bearing signs (not shown) can be attached to the front panel portions of the upper and lower basket assemblies. Preferably, the signs are held in sign frames, such as frame 212 seen in the Figures, preferably of square or rectangular configuration. The sign frame 212 is secured to the front panel of the upper basket assembly for holding a sign or a tag that identifies a product or service provider whose products or services are offered in markets. Attached to the front panel of the lower basket assembly are signs 214 for identifying the owner of the cart and the store from which the cart was purchased.

The present invention contemplates a method for deterring theft of "conventional" shopping carts which entails the sale of personal carts of a type similar to those described herein to customers by the markets or by third party cart vendors (as for example, vendors who can sell the carts directly to the customer either in the markets or through separate storefronts).

The vendors of services or goods will pay the market a fee for the market to supply vendor product advertising or event promotions or other advertising on a tag or card held in the sign frame 212 on the customer's personal cart. The market's vendors then supplies to the customers discount or rebate coupons for vendor supplies or services currently available in or at the market, for future purchases of vendor supplies or services, or for promotional give-aways. In a reasonably short period of time, the discounts or rebates given to the customer via the coupons will add up to the cost of the cart, and all discounts or rebates thereafter made available to the customer run toward developing an increasing "value" component attributable to ownership of the cart.

Moreover, by making such personal carts available for purchase to the customer, the markets can reduce their own in-store inventories of conventional shopping carts. And now, with recent state and municipal legislation being passed or at least being considered for the imposition of fines on markets whose carts are not maintained at the premises of the markets, a program such as the one outlined above would not only result in fewer carts being removed from the markets premises by customers, but also an improvement in the appearance of the surrounding community.

As seen in the Figures, a locking element 62 is provided on the upper horizontal element of the rear panel R. The element 62 has gripping grooves at opposite ends thereof. One of the grooves grip onto element 44a. The other groove can be releasably secured onto a horizontal element in the bottom panel of the upper basket assembly when the upper basket assembly only is pivoted into a collapsed position as shown in FIG. 6. When the cart is in this partially collapsed position, goods contained in the lower basket assembly can be accessed. The cart can also be used with the upper basket assembly in a collapsed and secured position when the customer's purchased goods in the lower basket assembly are taller than the height of the lower basket assembly.

Inverted U-shaped hooks 72, formed as extensions of the front panel of the upper basket assembly, extend below the floor panel of the upper basket assembly to sit one the upper horizontal element of the lower basket assembly to facilitate support of the upper basket assembly on the lower basket assembly.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. A multi-level personal utility cart, comprising:
   a frame including a handle having a rearwardly positioned upper portion, side portions, and a forwardly extending lower portion,
   a first basket assembly having a portion pivotably secured to said frame,
   a second basket assembly disposed atop the first basket assembly and pivotably secured to said frame,
   said first and second basket assemblies being simultaneously pivotable on said frame toward said handle upper portion so that said first and second basket assemblies can be collapsed against a portion of said frame into a compact and substantially planar structure, and
   access to said first basket assembly, when both baskets are opened, being obtained only by collapse of said second basket assembly.

2. The multi-level personal utility cart of claim 1, and further including wheels supported on said lower handle portion.

3. The multi-level personal utility cart of claim 2, wherein said wheels are swivel wheels and are spaced apart from one another.

4. The multi-level personal utility cart of claim 2, wherein said frame further includes a vertical support member depending from said handle portion, and a second set of wheels supported on said support members.

5. The multi-level personal utility cart of claim 1, wherein said first basket assembly is supported on said lower portion of said handle.

6. The multi-level personal utility cart of claim 1, wherein said first and second basket assemblies each includes panels at the front, sides, and bottom thereof, said second basket assembly further being supported by said first basket assembly.

7. The multi-level personal utility cart of claim 6, wherein said handle includes U-shaped segments at the upper and lower portions thereof, said U-shaped segments connecting opposing sides of said handle.

8. The multi-level personal utility cart of claim 6, wherein said front side and bottom panels of upper and lower basket assemblies are substantially planar elements.

9. The multi-level personal utility cart of claim 8, wherein said substantially planar elements are comprised of wires in a grillwork configuration.

10. The multi-level personal utility cart of claim 6, wherein said frame includes tag holders on the front panel of first and second basket assemblies for supporting indicia-bearing tags.

11. The multi-level personal utility cart of claim 1, wherein said frame includes a grillwork backbone and vertically extending, parallel support members, said backbone extending laterally between said support members and forming the rear panel for each of said upper and lower basket assemblies.

12. The multi-level personal utility cart of claim 6, wherein said frame includes slide members slidably supported on said side portions of said handle, said slide members supporting therebetween a grillwork backbone panel which forms the back panel of the first and second basket assemblies when the cart is fully open.

13. The multi-level personal utility cart of claim 12, wherein each of said side portions of said handle include a locking protruberance, and each of the slide members include a lock adapted to engage the locking protruberance to hold a respective slide member in a secure, fixed, location on the side portion of the handle on which the slide member is supported.

14. The multi-level personal utility cart of claim 1, wherein said frame includes dip elements carried by first basket assembly for securing second basket assembly to the first basket assembly, said clip elements being releasably secured to the front of at least the second basket assembly.

15. The multi-level personal utility cart of claim 1, wherein said frame includes parallel hook members on a portion thereof for suspending the cart, when the cart is collapsed.

16. The multi-level personal utility cart of claim 1, wherein said first and second basket assemblies are comprised of wire grillwork.

* * * * *